No. 758,412. PATENTED APR. 26, 1904.
W. L. & F. S. CARD.
ORE CONCENTRATOR.
APPLICATION FILED AUG. 18, 1902.
NO MODEL. 7 SHEETS—SHEET 5.
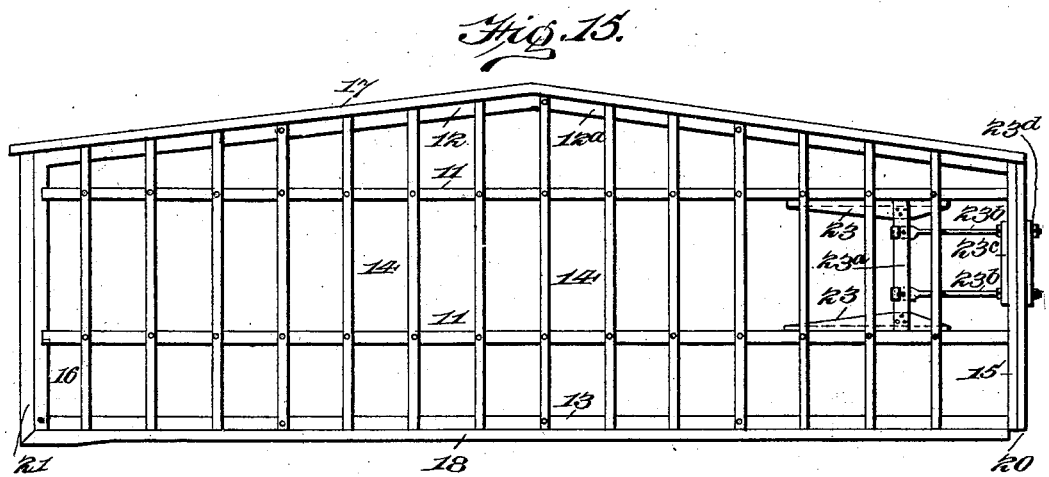
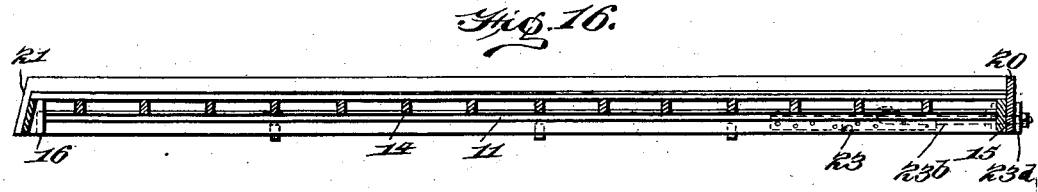
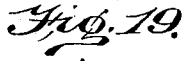
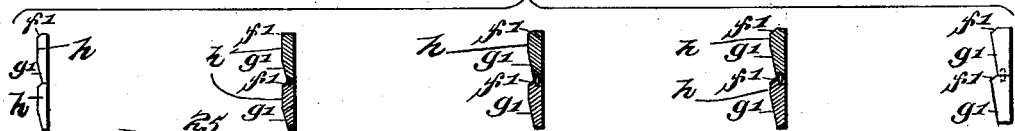
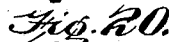
THE NORRIS PETERS CO., PHOTO-LITHO., WASHINGTON, D. C.

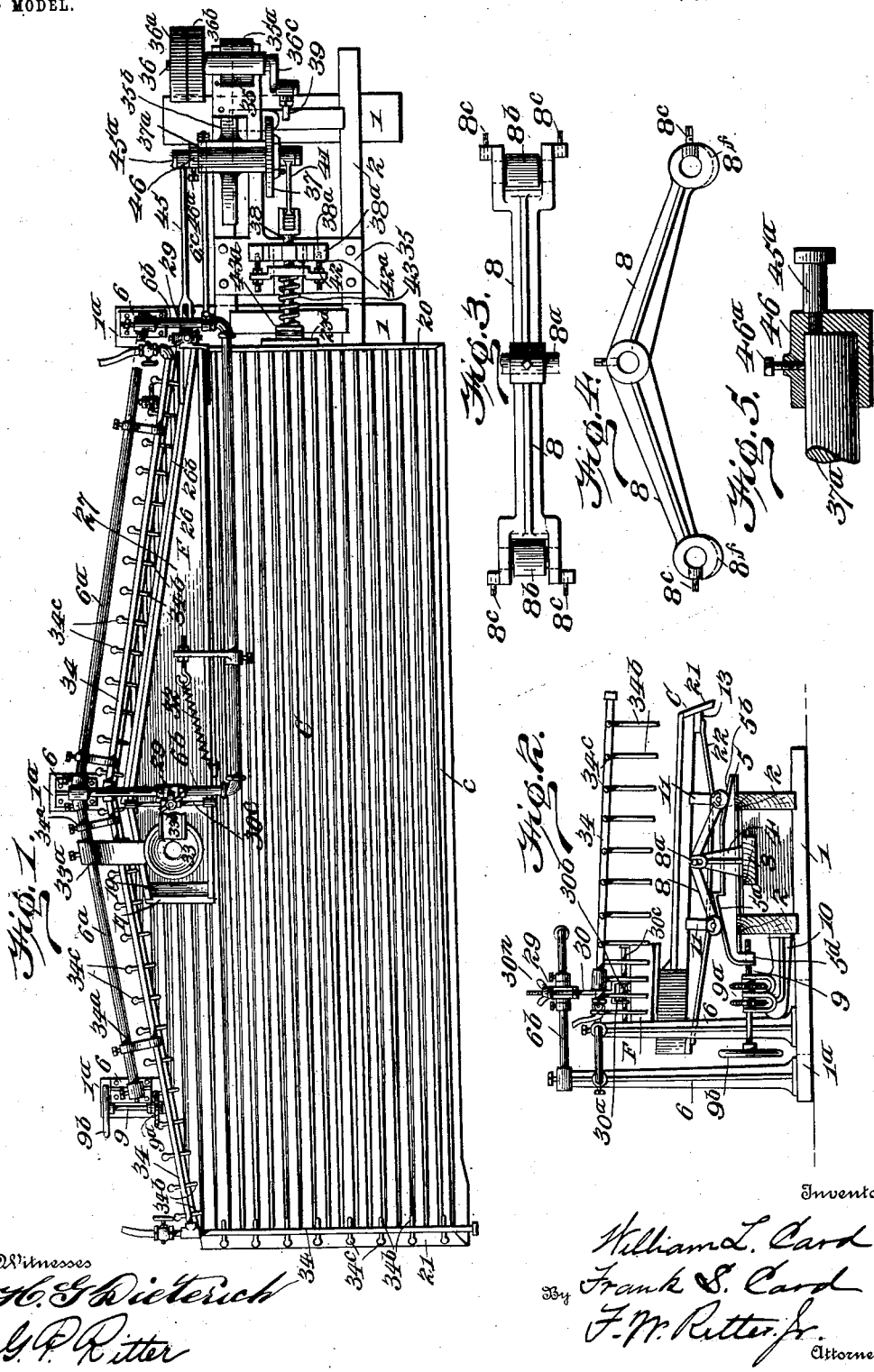

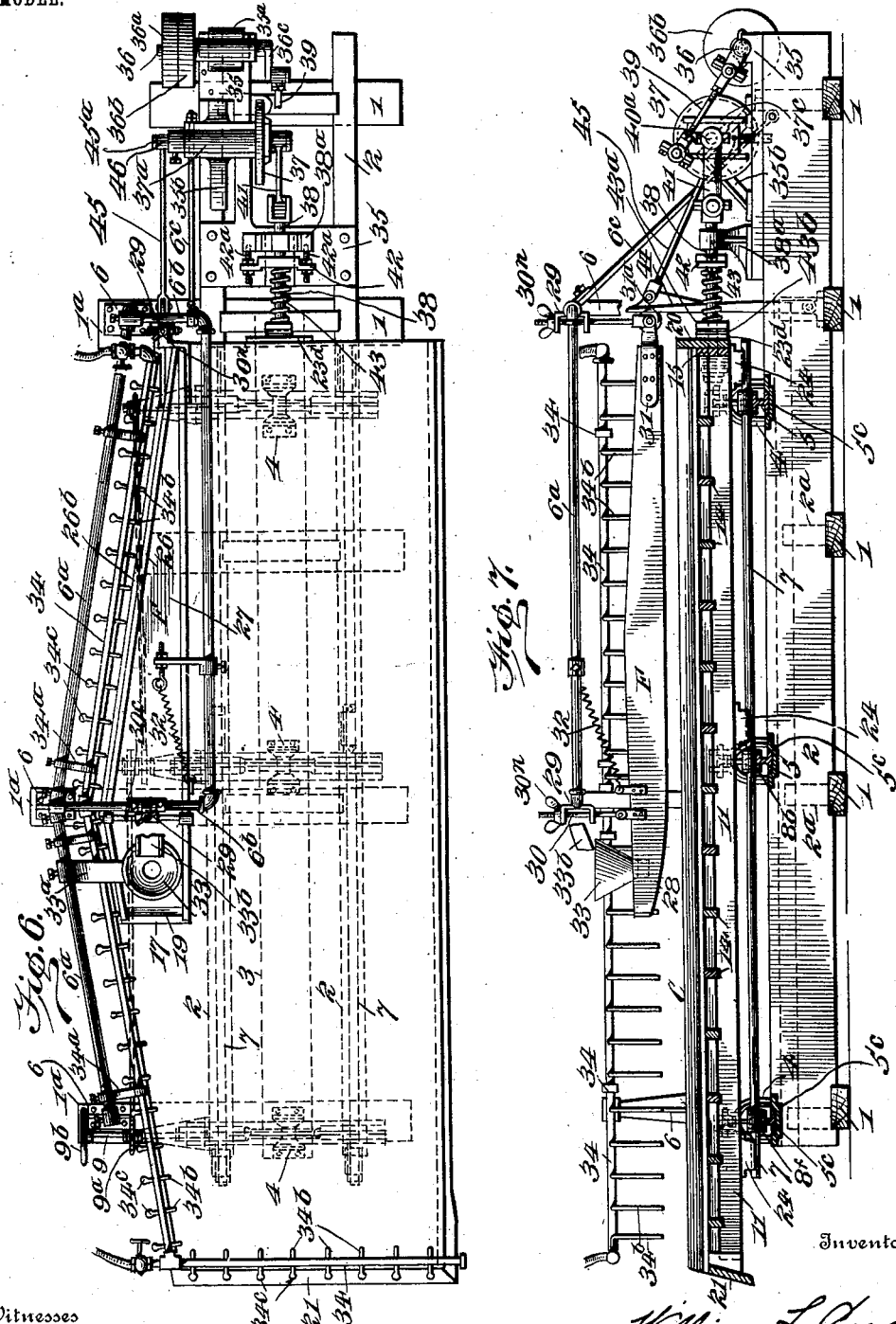

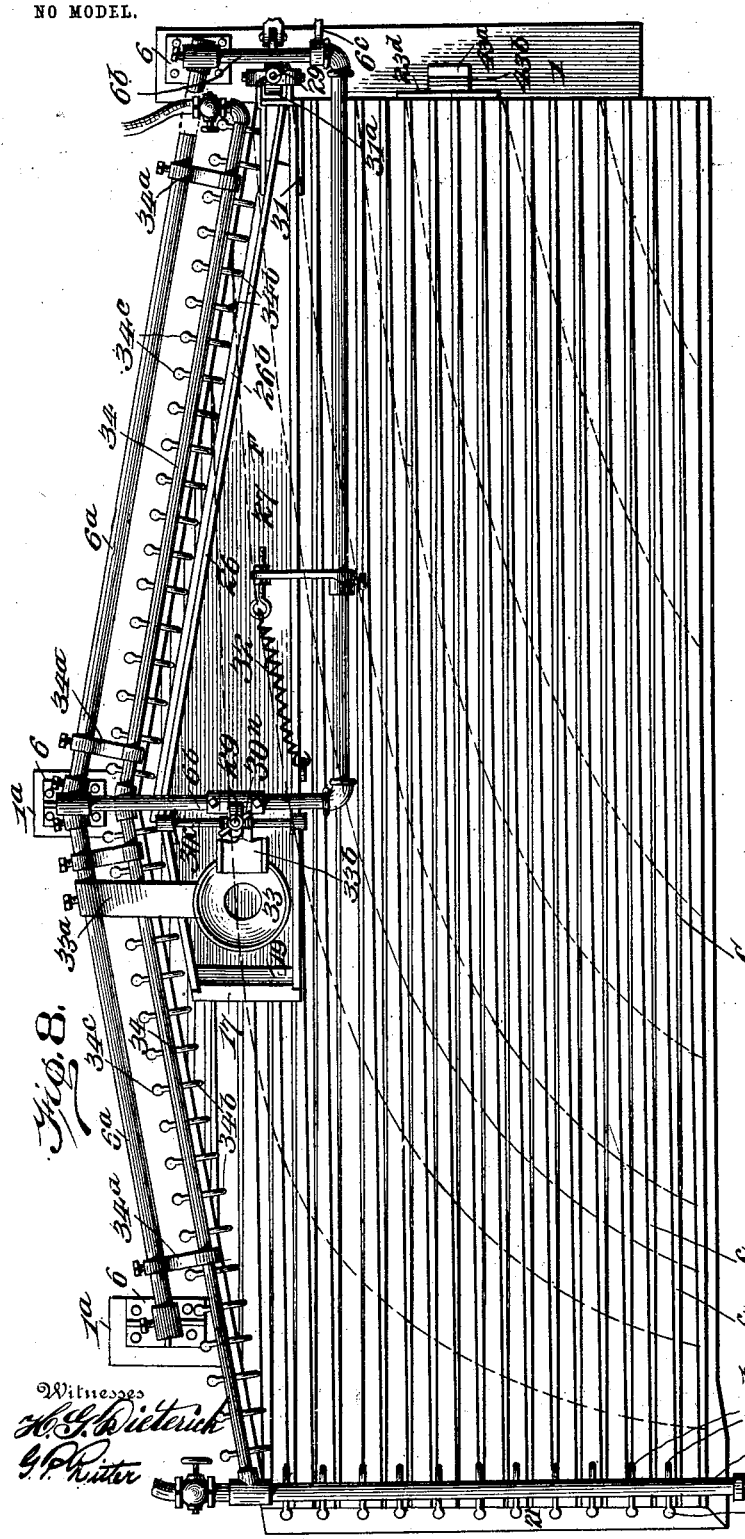

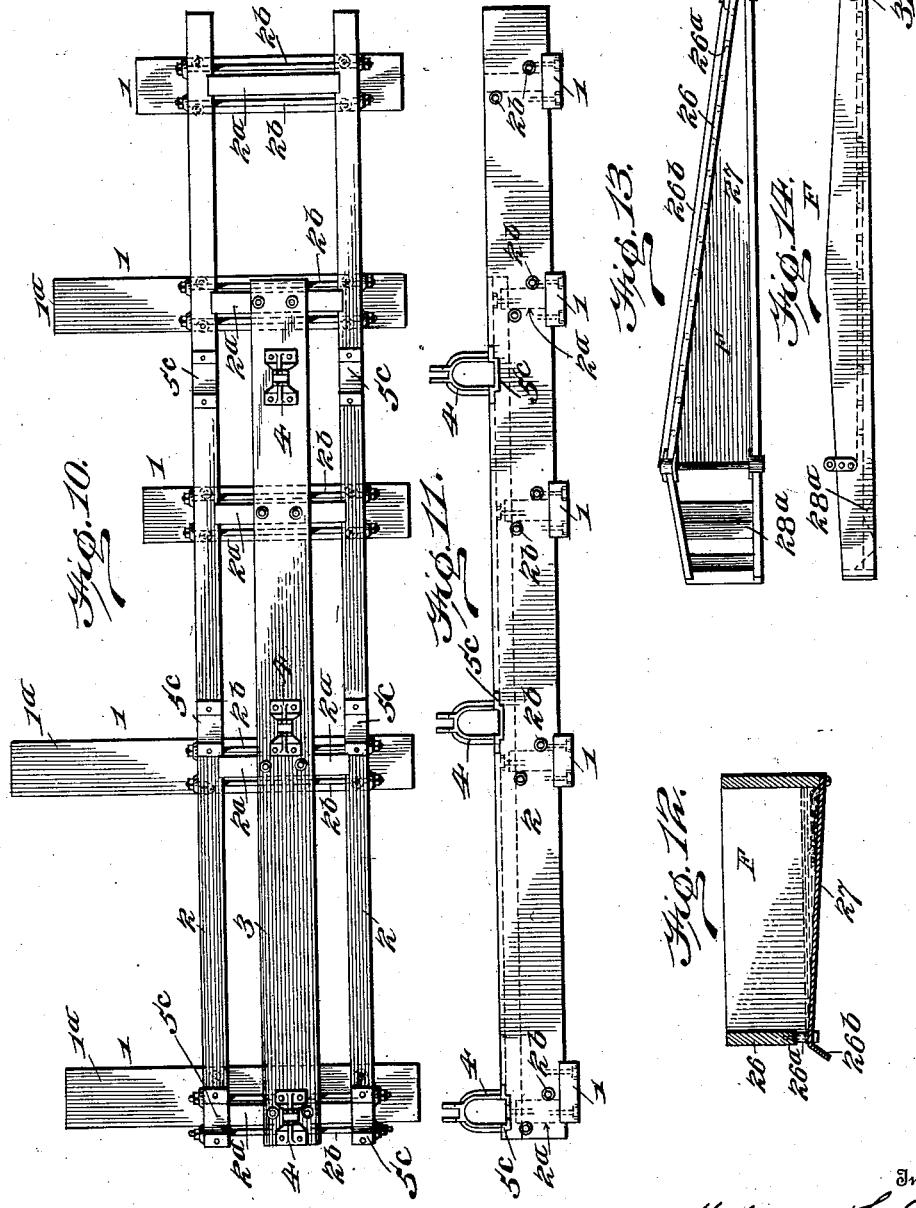

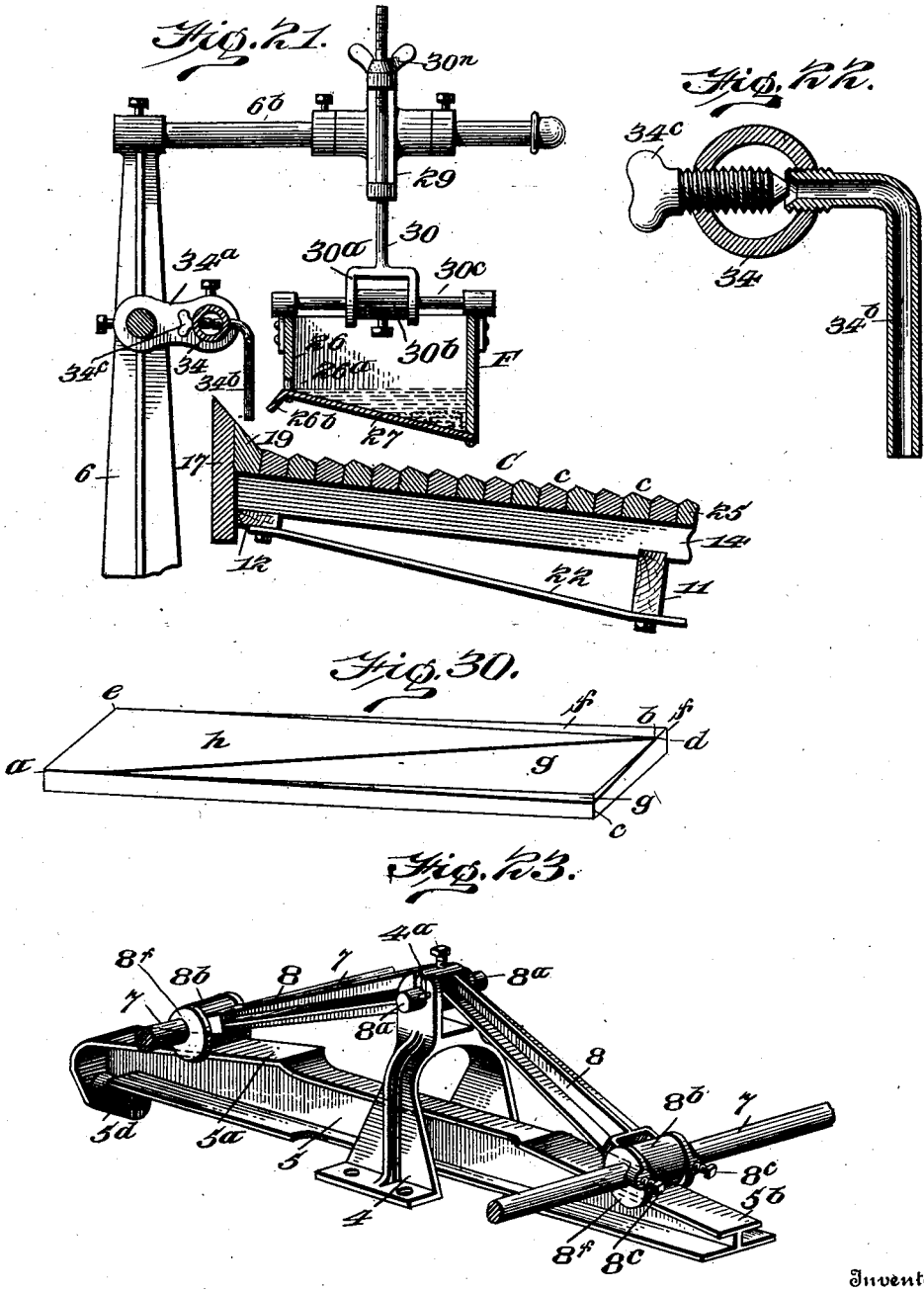

No. 758,412. PATENTED APR. 26, 1904.
W. L. & F. S. CARD.
ORE CONCENTRATOR.
APPLICATION FILED AUG. 18, 1902.
NO MODEL. 7 SHEETS—SHEET 7.
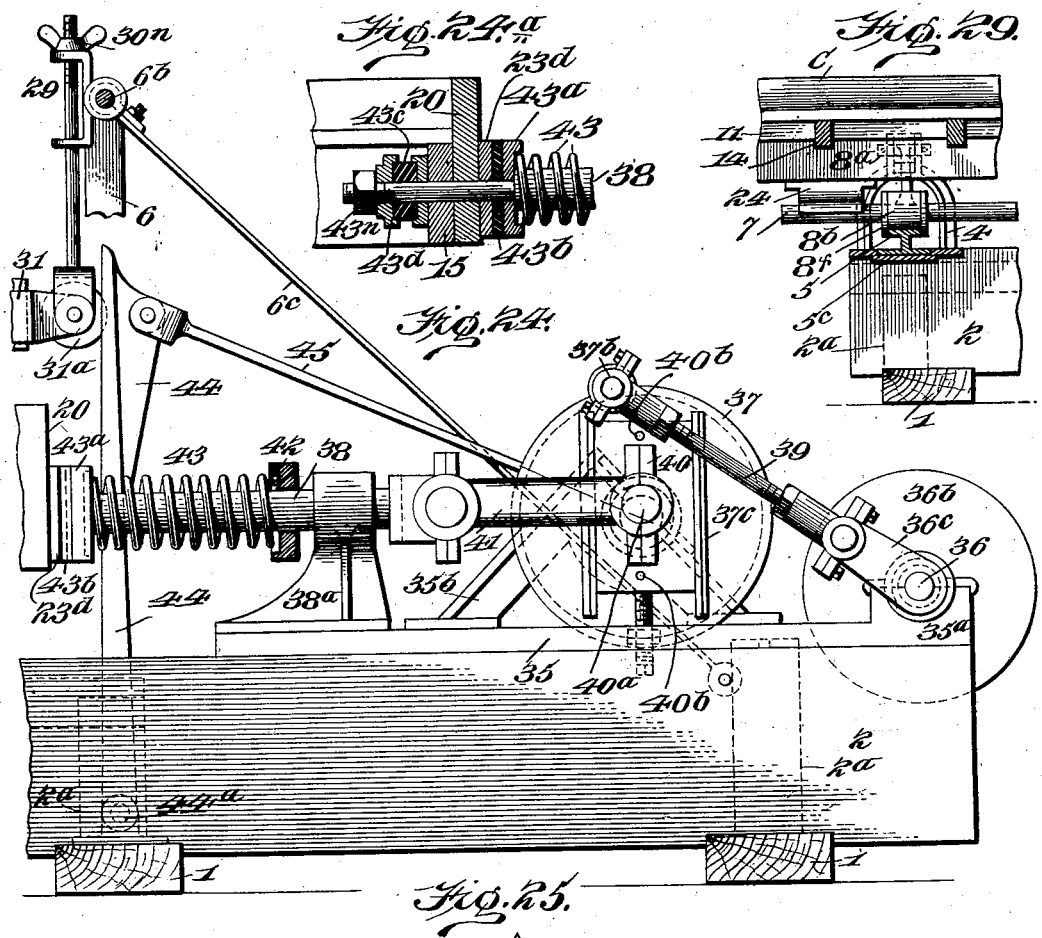
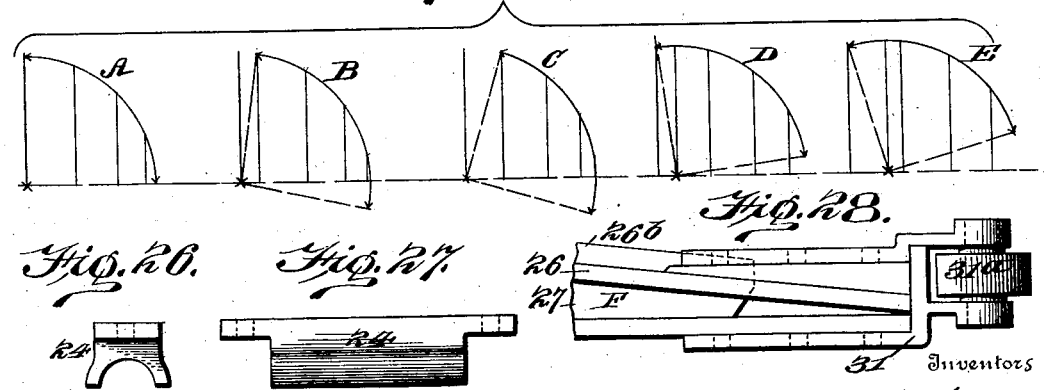
Witnesses
H. G. Dieterich
G. P. Ritter
Inventors
William L. Card
Frank S. Card
By F. W. Ritter, Jr.
Attorney No. 758,412. Patented April 26, 1904.

UNITED STATES PATENT OFFICE.

WILLIAM L. CARD, OF DENVER, AND FRANK S. CARD, OF CANON CITY, COLORADO.

ORE-CONCENTRATOR.

SPECIFICATION forming part of Letters Patent No. 758,412, dated April 26, 1904.

Application filed August 18, 1902. Serial No. 120,045. (No model.)

*To all whom it may concern:*

Be it known that we, WILLIAM L. CARD, residing at Denver, in the county of Arapahoe, and FRANK S. CARD, residing at Canon City, in the county of Fremont, State of Colorado, citizens of the United States, have invented certain new and useful Improvements in Ore-Concentrators; and we hereby declare the following to be a full, clear, and exact description of the same, reference being had to the accompanying drawings, in which—

Figure 1 is a plan view of a concentrator-table and its adjuncts embodying our invention. Fig. 2 is a front end view of the same. Fig. 3 is a plan view of one of the cross-arms of the tilting frame and the end rollers thereof. Fig. 4 is a side elevation of one of the cross-arms of the tilting frame. Fig. 5 is an enlarged view of the end of the oscillating movement shaft and a sectional view of the adjustable cap and crank for the pitman of the feeder-vibrator. Fig. 6 is a plan view similar to Fig. 1, the concentrator-channels of the table being omitted for sake of clearness and to permit the tilting frame which supports the table to be shown in dotted lines. Fig. 7 is a side elevation of the subframe, the feeder, and the dressing-water distributer and a longitudinal vertical section of the concentrator-table, taken on the tailings or discharge side of its longitudinal center. Fig. 8 is an enlarged plan view of the concentrator-table, the feeder, and the dressing-water distributer, the curved dotted lines indicating points of equal depth in the channels. Fig. 9 is a side elevation of the feeder looking at the feed side of the device and showing the feed-outlet and lip. In this figure a portion is broken away to show one of the distance-blocks and the wood-screw, by means of which the bottom of the feeder is secured to the side at the feed-outlet. Fig. 10 is a detail plan view of the subframe which supports the intermediate or tilting frame of the concentrator, also showing the position of the pillow-blocks of the tilting frame and the channeled guide-plate for the tilting-wedges. Fig. 11 is a side elevation of the subframe shown in Fig. 10. Fig. 12 is an enlarged transverse sectional view of the feeder, showing the bottom thereof inclined away from the feed-outlet. Figs. 13 and 14 are respectively a plan and a side elevation of a feeder having a modified means for preventing wave action in the feeder. In the main figures of the drawings the inner end of the feeder-bottom is shown as curved to prevent wave action. In the modification wave-cleats are shown. Fig. 15 is a detached plan view of the concentrator-table frame. Fig. 16 is a longitudinal sectional view of the concentrator-table and its frame. Fig. 17 is a transverse section of the concentrator-table and its frame. Fig. 18 is a plan view of two of the strips which go to make up the concentrating-surface (or channels) of the table. Fig. 19 illustrates the opposite ends and intermediate sections of the table-strips shown in plan view, Fig. 18, indicating how the concentrating-channels gradually narrow and shallow from the rear to the forward end of the table. Fig. 20 is a perspective view of the table-strips shown in plan, Fig. 18. Fig. 21 is an enlarged detail side elevation of a portion of the framing which supports the feeder and dressing-water distributer; also, transverse section of the feeder and a portion of the concentrator-table, showing the means for supporting and adjusting the feeder and the relation of the feeder and dressing-water distributer to the concentrating-table. Fig. 22 is an enlarged sectional view of the dressing-water distributer, showing the water-pipes, the bent nozzles, and the plug for controlling the volume of dressing-water delivered on the table at any given point. Fig. 23 is a detached perspective view of a portion of the tilting frame which carries the concentrator-table and the tilting-wedges for adjusting the inclination of the tilting frame and superposed concentrating-table. Fig. 24 is an enlarged side elevation of the table and feeder-actuating mechanism or "movement." Fig. 24ª is an enlarged detail sectional view of the rear end of the concentrating-table frame and the draw-bar for actuating the table, said view being supplemental to Fig. 24. Fig. 25 is a series of diagrams illustrating the time and throw or travel of the movement. Figs. 26 and 27 are enlarged end and side views of the slide-bearings of the table, which travel on the track-rods of the tilting frame. Fig. 28 is an enlarged plan view of the pointed end of the feeder, showing the fork or jaw therefor and the roller which engages the vibrator which actuates the feeder. Fig. 29 is a detail sectional end view of the tilting-wedge and the bifurcated end of the cross-arm of the tilting frame and the antifriction-roller in the end of the cross-arm of the tilting frame, together with a cross-section of the end of the tilting-wedge and its channeled guide-plate. Fig. 30 is a diagram illustrating the method of cutting or beveling the strips which are used in forming the concentrating-surface of the table.

Like symbols refer to like parts wherever they occur.

Our invention relates generally to that class of ore-dressing or ore-concentrating devices which have in common a longitudinally-reciprocating table or concentrating-surface disposed in a substantially horizontal position in a line parallel to its line of motion and adjustably inclined transversely thereof, pulp-feeding devices and means for supplying a proper amount of dressing-water to the table—that is to say, the concentration and delivery of the concentrates is effected by the action of gravity influenced by the flow of dressing-water which stratifies the particles according to their relative specific gravity and carries off the gangue, and by the reciprocating movement of the table which causes the travel, stratification, and delivery of the values or concentrates.

The efficiency of ore-concentrating tables may be stated in terms of their capacity, cleanliness of product, and saving of values. These three results are the product of many independent factors—as, for example, the configuration of the table, the character and lateral inclination of the concentrating-surface, the frequency, length, and nature of the reciprocating movement of the table, the manner of feeding the pulp and dressing-water to the table, and the amount of such pulp and dressing-water. In our present invention these several factors are each made capable of independent control and adjustment, thus insuring a balancing of the coacting elements whereby the highest efficiency results.

Capacity of output in concentrating-tables has heretofore been largely increased by giving to the concentrating-surface a steeper inclination and providing it with riffles to arrest the heavier particles in their transverse flow across the table, said heavier particles being projected toward the discharge end of the table by the momentum imparted to them by the table-moving mechanism; but this procedure has resulted in the loss of fine values and a final product in which more or less of the gangue matter was present. To overcome this latter difficulty, (impurity of product,) but not the former, (loss of fine values,) tables have been constructed in which the pulp is caused to traverse first a riffled and then a plane surface, thus further dressing the product of the riffles, but on account of the eddies and counter-currents set up in the space or trough between the riffles the finer values are successively washed over the riffles from trough to trough and pass off with the gangue, while the bulk of the separation is confined to a narrow diagonal zone and to the saving of the larger and heavier particles or values.

To obtain the theoretical results and avoid the practical defects of the riffled constructions, we compose the concentrating-surface of our table of a series of longitudinal depressions or channels having throughout their lengths the general operative cross-section of a prospector's gold-pan, and which preferably taper gradually or become narrower and shallower from the rear to the forward end of the table, and such a concentrating-surface embodies one feature of our invention. Said depressions or channels may be of uniform character from the feed side to the tailings side of the table and may extend the length thereof, or they may be successively of a slightly-increasing depth at the rear end from the feed to the tailings side of the table and may terminate at different points toward the forward or front end of the table, according to circumstances or the desire of the constructor, without departing from the scope of our invention, the essential being that the grooves or channels shall throughout their length preserve the recited cross-section of the prospector's pan or characteristic obtuse-angled bottom.

It results on account of the form and variable area of the progressive cross-sections of the channels and the constantly-diminishing quantity of the combined concentrates and gangue that the channels are kept filled, and thus present a plane surface so far as relates to the dressing of the lighter gangue constituents of the pulp is concerned; but so far as arresting the heavier particles is concerned the whole surface is channeled, and as these channels all contract laterally and shoal vertically from the rear to the forward end of the table, their contents being gradually lifted so that the superstrata can be acted on by the transversely-flowing dressing-water, it follows that the whole surface of the table, and not a narrow diagonal zone merely, performs the double function of both a riffled and a plane surface in the best possible manner, there being no eddies and counter-currents to exert an excavating action, as in the case of riffles.

A second feature of our invention relates to the superficial area of the table and consists in giving to the table or concentrating-surface an increased width at some point intermediate of its ends, preferably adjacent to its transverse center, and so controlling the pulp fed thereto that the finest and lightest particles of the pulp will be delivered upon the table at or near its greatest width and at the upper edge thereof, while the heavier and coarser particles will be delivered at the rear of the table at a point nearer the longitudinal axis of the concentrating-surface, and particles ranging from the most finely comminuted to the coarsest will be delivered upon the table at intermediate points, according to their relative weight and size. As a result of this feature of our invention the finer values have a shorter distance to travel longitudinally of the table to reach the point where the concentrates are discharged, and between the point where they are fed to the table and their point of discharge as concentrates more intercepting-channels are interposed between the feed-point and the gangue or tailings discharge than is the case with the coarser particles, which are delivered upon the table farther to the rear and nearer the lower edge thereof. It also results from the form of table or concentrating-surface and manner of feeding the pulp thereto that the lower zone of coarser particles forms an effective barrier to the escape of the finer values, the latter becoming embedded in and protected by the former and being carried to discharge by the more rapid advance of the heavier particles, and, further, it is thus made possible to so proportion the dressing-water that a gradually-diminishing volume may be supplied from the point at or near the rear of the table where the coarser particles are delivered to the point near the middle of the table, where the most finely-comminuted pulp is fed on, thus effecting a rapid separation of values from the coarser particles of matrix or gangue without endangering the saving of the fine values.

A third feature of our invention relates to the method of supporting the table and effecting the adjustable lateral inclination thereof, and consists in the combination, with the concentrating-table, of a tilting frame upon which the table is slidably mounted, said table being longitudinally pivoted in a plane which is parallel with the longitudinal axis of the table and its actuating device and of oppositely-inclined and oppositely-disposed movable inclines or wedges for varying the lateral inclination of the tilting frame and superposed table, whereby the table is at all times afforded a firm bed or foundation, and the longitudinal axes (or centers) of the bed or subframe, tilting frame, and concentrating-table being in the same vertical plane and coincident with the plane of the axis of the table-operating mechanism all vibration or tremulous motion of the table and the evils arising therefrom are avoided.

There are other and further novelties in elemental construction, as well as in particular combinations and arrangements of elements, all of which will hereinafter more fully appear, and will be finally pointed out in the claims.

We will now proceed to describe our invention more fully, so that others skilled in the art to which it appertains may apply the invention not only as herein illustrated, but under such modifications thereof as surrounding conditions or requirements may dictate.

The structure considered as a whole and in the order of its erection embraces a subframe, a frame for the support of the feeder and dressing-water distributer, a tilting frame, the concentrator-table and its concentrating-surface, a feeder, a dressing-water distributer, and the mechanism (the movement) for reciprocating the table and feeder, and for the sake of clearness the preferred construction of said parts will now be described in the order mentioned.

In the accompanying drawings, 1 1 indicate mudsills properly positioned for the support of the longitudinal timbers of the subframe and extended laterally therefrom, as at $1^a$ $1^a$, to form a foundation for the uprights of the frame which supports the feeder and the dressing-water distributer-pipes. Properly secured to said mudsills 1 are two longitudinally-disposed timbers 2 2, spaced and braced by the intermediate cross-pieces $2^a$ $2^a$, the ends of which may be let into the longitudinal timbers 2, and the whole braced and bound by the cross-rods $2^b$ $2^b$ or in other suitable manner. Centrally disposed between the longitudinal frame-timbers 2 and supported by and secured to the cross-timbers $2^a$ $2^a$ is the stringer 3, which occupies the longitudinal center of the structure and constitutes the bed piece or support for the pillow-blocks or arched posts 4 of the tilting frame.

5 5 indicate wedges for changing the inclination of the tilting frame, which wedges have a transverse sliding movement in the guide-plates $5^c$ in a line or lines with the posts 4, through whose arches the wedges pass without contact.

At the feed side of the table, supported by and having their base-plates secured to the mudsills 1 1, are a series of suitable uprights 6 6, (preferably cast-iron standards,) which carry a series of rods $6^a$ $6^b$, connected by suitable elbows and so disposed as to constitute a support for the suspension of the pulp-feeder and the dressing-water pipes.

By referring to Fig. 1 and Fig. 8 it will be noted that the rods $6^a$ $6^a$ form a frame with inclined side at the rear feed side of the table, their ends connected by transverse bars $6^b$, which carry the adjustable suspension devices of the feeder, said frame being supported at its rear end by a brace-rod $6^c$, which extends from the said frame to the foundation and is arranged in the line of vibration of the feeder.

The pillow-blocks or arch-posts 4, which are erected on the central stringer 3, have at their apices jaws or open slots 4ª to receive pins in the hubs of the cross-arms of the tilting frame.

The tilting frame which carries the concentrating-table is comprised of parallel track-rods 7, connected by a series of cross-arms 8, corresponding in number to the number of pillow or arch posts 4, to which track-rods the cross-arms 8 are rigidly secured by set-screws 8ᶜ or otherwise. Each of the cross-arms 8 is provided at its middle with a hub having a pin 8ª, which when the tilting frame is in position, enters the open slots 4ª in the apices of the pillow-blocks or posts 4, and since the pins 8ª have a free vertical movement, while the weight of the tilting frame is carried by the rollers 8ᵇ, the longitudinal axis of the table is at all times maintained in the same vertical plane. The ends of the cross-arms 8, through which pass the track-rods 7, are bifurcated to receive antifriction-rollers 8ᵇ, which rollers are or may be journaled on the track-rods 7 where they pass through said cross-arms 8 and rest on the tilting-wedges or inclines 5, by means of which the tilting frame is adjusted. In order to maintain the relation between the tilting frame and the wedges or inclines 5, the free or bifurcated ends of cross-arms 8 or flanges thereon extend over and include the wedges 5, as indicated at 8ᶠ. In arranging the track-rods and cross-arms which constitute the tilting frame the longitudinal axial center of the frame is preferably made to coincide with the longitudinal center or stringer 3 of the subframe, and the track-rods 7 are vertically above the longitudinal timbers 2 2 thereof.

The tilting-wedges 5 5, for adjusting the inclination of tilting frame, which are composed of the oppositely-disposed inclines 5ª 5ᵇ, are arranged to slide transversely of the subframe in suitable ways or channeled guide-plates 5ᶜ, and are actuated by means of screw-rods 9, (see Fig. 2, Sheet 1,) which are supported by the brackets 10, carried by the subframe, and which engage the internally-threaded downwardly-projecting ends 5ᵈ of the tilting-wedges 5.

In order that the several tilting-wedges 5 5, by means of which the inclination of the concentrating-table is effected, may be moved in unison and uniform distances, the several screw-rods 9 are provided with sprocket-wheels 9ª, which are connected by suitable sprocket-chains, (not shown,) and the said screw-rods 9 may also be provided with hand-wheels 9ᵇ or equivalent means for rotating the same.

The construction of the tilting frame and tilting-wedges and the relative arrangement of said parts being substantially as specified, the said tilting frame may be given any desired inclination, and with it the table or concentrating-surface, without changing the position of the longitudinal axis thereof by rotating the hand-wheel 9ᵇ in such direction as to cause the wedges to move in unison (through the medium of sprocket-wheels 9ª and sprocket-chains) toward the feed side of the table, (to the left, Fig. 2,) whereupon the feed side of the tilting frame (and table) will be raised and the discharge or tailings side of the tilting frame (and table) will be correspondingly lowered, the tilting frame being rocked on its longitudinal axis upon the pins 8ª.

The concentrator-table, which is supported by and slides longitudinally upon the track-rods 7 of the tilting frame, is comprised of the longitudinal frame timbers or stringers 11 11, preferably two in number, so placed as to be in vertical alinement with the track-rods of the tilting frame and the longitudinal timbers 2 2 of the subframe, and thus cause the vertical plane of the longitudinal axis of the table to coincide with stringer 3 or the corresponding axes of the subframe and tilting frame. These longitudinal stringers 11 11, together with the side timbers 12 12ª and 13, are connected by the cross-timbers 14, which may be let thereinto, and by the end pieces 15 16, the whole being suitably bolted or otherwise secured to form the foundation for the longitudinal strips which constitute the concentrating-surface of the table.

The side timbers 13 on the discharge or tailings side of the table may be parallel to the longitudinal axis of the table; but the timbers 12 12ª at the feed side of the table will be set at an angle to the said longitudinal axis of the table, their meeting-point (or apex) being determined by the extent of the feed and where the greatest width of the table is desired, and the cross-timbers 14 will have their lengths proportioned to their relative distances from the ends of the table. Additional side strips 17 and 18, a corner-fillet 19, (see Fig. 21, Sheet 6,) and rear and front end pieces 20 21 go to make up the bed-frame, and the whole structure is stiffened by transverse iron braces 22, to which longitudinal metal tie-rods may be added, if desired.

On the inner side of each longitudinal timber 11, (or stringer,) near the rear end thereof, is secured an angle-iron 23, (see Fig. 15, Sheet 5,) the two being connected by a steel cross-piece 23ª, which affords attachment for the draw-rods 23ᵇ, the rear ends of said draw-rods passing through inner and outer iron or steel plates 23ᶜ 23ᵈ and the intermediate timbers 15 and 20 being secured thereto by suitable nuts, thus further stiffening the rear end of the table and providing means for attaching the table-operating mechanism.

To the under side of each of the longitudinal timbers 11 are attached two or more slide-bearings 24, (see Figs. 7, 26, 27, and 29,) which rest and travel longitudinally on the track-rods 7 of the tilting frame, thus permitting the longitudinal reciprocation of the concentrating table at any desired inclination of the table and tilting frame without disturbing the relation of the longitudinal centers of tilting frame, table, and movement and without giving rise to any irregular or tremulous motion of the table or concentrating-surface.

C indicates the concentrating-surface of the table, which has two characteristics—viz., a contour which results from its feed side being at an angle to the longitudinal axis of the table and the greatest width being intermediate of the ends of the table and a concentrating-surface made up of a series of longitudinal channels which shallow from rear to front of the table and whose cross-section at any given point is that of the operative section of the prospector's gold-pan—and said concentrating-surface may be secured in any manner or by any means desired.

On reference to Fig. 21, which shows in detail an enlarged cross-section of a portion of the table, it will be noted that the concentrating-channels $c$, taken in respect to the flow of the dressing-water across the table, are comprised of a gentle downward incline from the feed side of the table and an abrupt or steep incline or rise toward the tailings side of the table, the two inclines forming an obtuse angle, the bottom of the channel being deepest contiguous to the tailings-discharge side of the table, and the same is to be taken as intended by us wherever in this specification we refer to the channels as having the cross-section of the operative section of the prospector's gold-pan.

Preferably we construct the concentrating-surface of a series of longitudinal strips 25, which may be of California redwood or any other suitable material.

For the purpose of illustration, but without intending to limit the invention thereto, we will assume that in forming the strips 25 we take the required number of redwood strips, which are each fifteen (15') feet long, three (3") inches wide, one and a quarter ($1\frac{1}{4}''$) inches thick at one end, and three-quarters ($\frac{3}{4}''$) of an inch thick at the other end. We lay each of these strips out by the lines $a\ b$, $a\ c$, and $b\ c$ for one cut, by this cut removing the section marked $g$. We also lay the strip out on the lines $e\ b$, $b\ d$, and $d\ e$ and then remove the section marked $f$, which results in strips of the form shown in plan in Fig. 18, in cross-section in Fig. 19, and in perspective in Fig. 20, with the steep tapering bevel $f'$ on one edge of the strip, the shallow tapering bevel $g'$ on the opposite edge of the strip, and the level portion $h$, so that when a series of strips 25 are laid together with two inclines uniting to form an obtuse angle, as indicated in Figs. 18 and 20, there will result a concentrating-surface composed of a series of channels $c\ c$, deeper at one side, $f'$, than at the other, $g'$, and intermediate level portion $h$, each channel having at any point in its length substantially the cross-section of a prospector's gold-pan and said channels gradually narrowing and shoaling from the rear to the front end of the table. Also for purposes of illustration we have shown all the channels $c\ c$ as converging both laterally and vertically to a point exactly at the front end of the table, the channels increasing in depth at the rear end of the table, say, about one thirty-second ($\frac{1}{32}''$) of an inch in consecutive order from the feed side to the tailings-discharge side thereof; but we do not confine ourselves to such dimensions, as they may be varied almost indefinitely and still retain the elements of our invention, as, for instance, some of the channels may terminate at points to the rearward of the front end of the table or at imaginary points forward thereof. To Fig. 8 of the drawings curved dotted lines have been added to indicate where the channels are of equal depth, the depth of the channels being equal where crossed by the dotted lines.

It will be noted that as a result of our construction the forward impulse given to the values by the movement of the table is less affected by the cross-flow of the dressing-water.

F indicates the feeder, which is of general triangular or tapering form, having its feed side 26 substantially parallel to the edge of the feed side of the table and on a line which intersects the longitudinal axis of the table at the rear and its opposite straight side parallel with the longitudinal axis thereof.

The length of the feeder F may be a little greater than half the length of the table, though this will depend somewhat on the point of greatest width of the table and the length of the feed thereon. The bottom 27 of the feeder is inclined downwardly from the feed-outlet $26^a$, and the feed-outlet $26^a$, which is coextensive with the inclined side of the feeder, is preferably about three-quarters ($\frac{3}{4}''$) of an inch in height and formed by interposing distance-pieces $27^a$ between the bottom 27 and side 26 and securing them to the said bottom 27 and side 26 by wood-screws $27^b$ or in other suitable manner. At the feed-outlet is a feed-lip $26^b$, over which the pulp passes to the feed side of the concentrator-table. In order to prevent wave action in the feeder F, the inner end of the bottom 27 may be curved, as at 28, Figs. 7 and 9, or in lieu thereof may be provided with wave-cleats $28^a$, as shown in Figs. 13 and 14 of the drawings. This feeder F is adjustably suspended at both ends from the cross-bars $6^b\ 6^b$ of the feeder-frame by means of oscillating brackets 29 and adjustable hanger-rods 30, provided with thumb-nuts $30^n$ and having jaws $30^a$, which embrace collars $30^b$, secured to cross-rods $30^c$ on the feeder. The pointed end of the feeder F is provided with a fork or jaw 31, which carries a roller $31^a$, said roller engaging the vibrator 44. The return motion of the feeder is effected by a spring 32, secured at one end to a bracket on one of the bars $6^a$ of the feeder-frame and at the other to a bracket on the feeder F.

33 indicates a stationary feed-hopper supported from the feeder-frame $6^a$ by a bracket $33^a$ or in other suitable manner and which receives the pulp from the feed-launder $33^b$ and delivers it to the reciprocating feeder F.

It will be seen that by a proper manipulation of the thumb-nuts $30^n$ of the adjustable hanger-rods 30 either or both ends of the feeder F may be raised or lowered, thus accommodating the position of the feeder to the elevation of the feed side of the concentrator-table when adjustments of the tilting frame and table are made by means of a hand-wheel $9^b$, as hereinbefore pointed out, and, further, that the inclination of the feeder may also be varied at will so as to distribute the pulp to the table either in equal volumes from end to end of the feed-lip $26^b$ of the feeder F or in increasing volumes toward either end of the feed-lip, as the nature of the ore and size of the pulp particles may require. The roller $31^a$, carried by the fork 31 on the end of the feeder F, and the vibrator 44 for actuating the feeder permit of the feeder adjustments specified.

By referring to Figs. 12 and 21 of the drawings it will be noted that the inner side of the feeder F is lower than the outer or feed side thereof, and consequently that the bottom of the feeder instead of being level is inclined away from the feed-outlet $26^a$. Hence by adjusting the heights of the ends of the feeder F by means of thumb-nuts $30^n$ so that the line of overflow of the feed-lip $26^b$ will be substantially level the overflowing pulp will be fed very evenly as to volume from end to end of the lip or about one-half the length of the table from its rear end forward, and as the stratum of pulp will be deepest at the widest part of the feeder F on its inner side, shoaling to the feed side and to the pointed end, the heavier and coarser particles under the influence of agitation will gravitate to the lowest points along the inner side of the feeder, following which they will be discharged upon the table at or very near the pointed end of the feeder or rear of the table, while from this point to the widest part of the feeder (which corresponds to the widest part of the table) the pulp particles will become finer and finer until the widest part of the feeder is reached, where the finest particles of pulp are fed. The value of the relation of the feed, as above pointed out, to the contour of the table and the cross-section of the concentrating-channels thereof will be readily recognized, as it will be noted that the finest and lightest particles of the pulp constituents will be delivered upon the table at or near its transverse center or widest part and at the upper side, the coarsest and heaviest particles at or very near its rear end, and the intermediate sizes graded between said points, so that the particles most difficult to save have the least distance to travel to reach the front of the table and a greater distance to travel and more channels to traverse to reach the tailings or discharge side of the table, while the coarser particles start forward on lines lower down on the table and form zones which intercept and carry forward such of the finer particles as may not be arrested in the upper channels of the table at the front thereof.

34 34 indicate the dressing-water pipes, which are connected up by elbows (see Fig. 8, Sheet 3, and Figs. 21 and 22, Sheet 6) and which are supported from the rods $6^a$ of the feeder support or frame by means of brackets $34^a$. Said dressing-water pipes are arranged along the feed side of the table and across the front end thereof and are provided with a series of feed-water distributers $34^b$, each of which is controlled by a thumb-screw plunger $34^c$ or suitable cock to regulate the volume of dressing-water delivered therethrough, so that the volume of dressing-water may be controlled at any given point of the table and graded to the character of the material at such point on the table.

Any suitable mechanism may be employed for imparting reciprocating motion to the table and feeder. That shown in the drawings and chosen for purposes of illustration comprises, in combination, an oscillating disk plate, a slide thereon, a crank on the shaft of the oscillating disk plate, and pitmen, one of which is eccentrically connected with the oscillating disk plate and the other with the slide, whereby the centers of motion may be adjusted to vary the length of stroke and times of acceleration independently and a strong forward impulse free of tremulous motion may be imparted to the table to increase its capacity without disturbing the stratification of the material thereon.

Referring to Figs. 5, 6, 7, and 24, which most clearly illustrate this mechanism or means for reciprocating the feeder and table, 35 indicates a bed-plate or base-plate firmly bolted to the stringers 2 2 of the subframe and on which are erected a guide-bracket $38^a$ for the draw-bar 38, which actuates the table C, and pillow-blocks $35^a$ $35^b$ for the power-shaft 36 and the shaft $37^a$ of an oscillating disk plate 37. On one end of the power-shaft 36 are mounted a loose pulley $36^a$ and a fast or balance-wheel pulley $36^b$, and to the other end of said shaft is secured a crank-arm $36^c$, having a wrist-pin for one end of a pitman 39, the opposite end of said pitman 39 being connected with an eccentrically-placed wrist-pin $37^b$ on the oscillating disk plate 37.

The pitman 39, which connects the crank-arm $36^c$ of the power-shaft with the oscillating disk plate 37, is of an extensible character, preferably being composed of end sections and a center bar, the latter having right and left hand threads and jam-nuts, as clearly shown in Fig. 24 of the drawings.

The oscillating disk plate 37 is provided on its face with guides 37$^c$ for a diametrically-disposed adjustable slide 40, which slide is provided with a wrist-pin 40$^a$ for one end of the pitman 41, which connects the oscillating disk plate 37 with the draw-bar 38. The adjustment of said slide 40 on the oscillating disk plate 37 may be provided for by means of bolts 40$^b$ in the slide, which are provided with nuts, whereby the slide may be fixed to move with the disk plate after adjustment.

On reference to Fig. 24 of the drawings it will be noted that the center of the wrist-pin 37$^b$ is deflected from a vertical line passing through the center of the shaft 37$^a$ of oscillating disk plate 37 and that the center of the wrist-pin 40$^a$ is above and in a vertical line with the center of the shaft of said oscillating disk plate 37, while the pitman 39, which receives its movement from the crank-arm 36$^c$ on power-shaft 36, is adjustable as to its length, from which it follows that the movement will be accelerated or retarded by adjustment of the length of pitman 39, while the length of stroke of the table will be controlled by adjustment of the slide 40, which controls the pitman 41 and the draw-bar 38, that actuates the table. The character and range of these independent adjustments will be readily seen by reference to the diagrams A B C D E, Fig. 25, in which the diagram A shows the resultant motion with the length of pitman 39 illustrated in the drawings. B and C show consecutive reductions in the length of pitman 39. D and E show consecutive increments of increase in the length of the pitman 39 over that shown in diagram A. The equal divisions of the arcs of the quadrants indicate equal divisions of time, and the distances between the perpendiculars on the horizontal line (which corresponds to the line of reciprocation of the table) indicate the accelerations and retardations of the moving table.

As a result of the relative arrangement of the centers of the operative mechanism an accelerated motion is imparted to the oscillating disk plate and thence to the table by means of the quadrant movement of the main wrist-pin 40$^a$, and the table has an accelerated forward movement terminating abruptly at the forward end of each stroke and a retarded rearward movement with a comparatively gentle termination and a period of comparative rest, which combined movements we consider best adapted for imparting forward impulses to the substrata of mineral upon the bed of the concentrating-table.

The draw-bar 38 (with which the slide 40 is connected by pitman 41) after passing through the guide-bracket 38$^a$ passes through a spring-washer or adjustable spring-seat 42, which washer or spring-seat is provided on both sides of the draw-bar with holes through which extend threaded rods 42$^a$ 42$^a$, provided with nuts, whereby the said washer or spring-seat 42 may be adjusted and secured at any desired distance from the guide-bracket 38$^a$ to adjust the power of spring 43. This draw-bar 38 after passing through the washer or spring-seat 42 passes through mainspring 43, (which is a coiled spring,) then through a cupped washer 43$^a$, the outside rubber washer 43$^b$, (see Fig. 24$^a$,) the cross-timbers 15 and 20 of the table-frame, the inside heavy rubber washer 43$^c$, then through a cast-iron cupped washer 43$^d$, and is finally secured by a compression-nut 43$^n$. The main or spiral spring 43 imparts the forward impulse to the table, while the india-rubber washers 43$^b$ and 43$^c$ operate to prevent shocks at the terminations of the strokes of the table when its movements are arrested.

To actuate the feeder, a vibrator 44 or vibrating lever is pivoted to the subframe, as at 44$^a$, and is arranged in line with the pointed or rear end of the feeder F and in engagement with the roller 31$^a$, carried by the jaw 31 of the feeder. The upper end of this vibrating lever or vibrator 44 is connected by means of a rod or pitman 45 with a wrist-pin 45$^a$ (see Figs. 1 and 5) on a rotatable cap 46, adjustable on the end of the shaft 37$^a$ of the oscillating disk-plate 37, so that the table C and the feeder F both receive their power from the same shaft.

It is here to be noted (see Fig. 24) that as the center of the wrist-pin 40$^a$ on slide 40, to which the pitman 41, that actuates the table C, is attached, is located above the axial center of shaft 37$^a$, so in order to secure the reverse reciprocation of table and feeder the wrist-pin 45$^a$, with which is connected the pitman 45, that actuates the vibrator 44, and hence the feeder, must be located below the axial center of shaft 37$^a$, and this can be readily effected after the slide 40 and wrist-pin 40$^a$ have been adjusted to obtain the desired movement of the table by loosening the set-screw 46$^a$ of rotatable cap 46 (see Figs. 1 and 5) and again tightening the set-screw when the cup 46 has been rotated on the end of shaft 37$^a$ to bring the wrist-pin 45$^a$ diametrically opposite wrist-pin 40$^a$.

The construction of the concentrator-table and its adjuncts being substantially of the character hereinbefore pointed out, the operation thereof will be as follows: The table and feeder actuating mechanism having been adjusted as to the relation of its centers—*i. e.*, the relation of wrist-pin 40$^a$ to the center of the shaft 37$^a$ of oscillating disk-plate 37—to obtain the required length of stroke, and the length of pitman 39 adjusted to control the character (acceleration, retardation, and interval of rest) thereof as well as the speed of shaft 36, which regulates the number of strokes per minute best for the ore to be treated, and the cap 46 adjusted to so position wrist-pin 45ª that the feeder shall have an opposite reciprocation or reverse movement to that of the table, the tilting-wedges 5 are next operated by means of hand-wheel 9ᵇ to give the concentrator-table C the required lateral inclination, and the feeder F will be adjusted by manipulating the thumb-nuts 30ⁿ to accommodate the elevation of the feed side of the concentrator-table and to obtain the required character of the feed for the pulp being fed, after which, and finally the thumb-screw plungers 34ᶜ of the dressing-water nozzles 34ᵇ may be adjusted to obtain the required volume and relative distribution on the table of the dressing-water. The several adjustments having been made as above noted to meet the requirements of the particular ore under treatment, the mechanism will be started to actuate the feeder and table, and the pulp from launder 33ᵇ will be admitted into stationary hopper 33, whence it will pass into reciprocating feeder F at its widest part, and owing to the inclination longitudinally and transversely of the feeder-bottom said pulp will be graded as it passes over the feed-lip 26ᵇ to the table C, so that the finer particles will be delivered to the table on the feed side at its widest part, thus having less distance to travel to the front thereof and a relatively greater distance to travel to the tailings or discharge side of the table, while the coarser particles, which will travel in proportion to their size a greater or less portion of the distance between the ends of the feeder until finally the coarsest are delivered at the pointed or rear end thereof, are delivered on the table at its rear and nearest the tailings or discharge side of the table. It thus follows that the points at which the pulp is delivered to the table will be determined by the relative sizes and specific gravities of the particles, and the dressing-water may be controlled to best meet the conditions, and it also follows that the number of channels c that exist between the point of feed and the tailings or discharge side of the table, as well as the distance from the point of feed to the front of the table, will bear a relation to the character of the pulp fed to the table at any given point. The pulp on reaching the surface of the table is acted on by several forces, viz: gravity, which stratifies the values in the channels, the movement of the table which causes the travel of the values toward the front end of the table and their final delivery into the concentrate-box, and the cross-flow of the dressing-water which carries the gangue to and over the tailings or discharge side of the table.

Owing to the character of the concentrating channels and their cross-section, whereby they gradually narrow and shallow from the rear to the front of the concentrating-surface, the values are gradually lifted as they travel from the rear to the front end of the table, so that as far as the cross-flow of the dressing-water is concerned the whole surface is or may be made a plane surface, and no eddies will be created in the channels to lift the fine values and cause them to travel with the gangue toward and over the discharge or tailings side of the table, while so far as the impetus of the throw of the table and the arresting of values are concerned the whole table is or may be made, in effect, a riffled surface.

Having thus described our invention, what we claim, and desire to secure by Letters Patent, is—

1. In an ore-concentrator, the combination of a concentrating-table having longitudinally-disposed channels adapted to discharge concentrates at one end, said channels having a transverse section formed by a gentle and an abrupt incline which meet at an obtuse angle, and means for imparting a longitudinal concentrate-discharging vibration to the table, substantially as and for the purposes specified.

2. In an ore-concentrator, the combination of a concentrating-table having a plurality of longitudinally-disposed elevations which taper both horizontally and vertically and are disposed to form intervening longitudinally-disposed channels which have a transverse section formed by a gentle and an abrupt incline which meet at an obtuse angle, and means for imparting to the table a longitudinal vibration, substantially as and for the purposes specified.

3. In an ore-concentrator, the combination of a transversely-inclined concentrating-table having a plurality of longitudinally-disposed rectilinearly-extending concentrating depressions or channels adapted to discharge concentrates at one end, which channels have a transverse section formed by a gentle and an abrupt incline which meet at an obtuse angle, and which both shoal and narrow longitudinally of the table, and means for imparting a differential longitudinal vibration to the table, substantially as and for the purposes specified.

4. In an ore-concentrator, the combination of a concentrating-table having a plurality of longitudinally-disposed rectilinearly-extending concentrating depressions or channels adapted to discharge concentrates at one end, said channels having a transverse section formed by the meeting at an obtuse angle of a gentle and an abrupt incline, which channels shoal longitudinally of the table, and means for imparting a longitudinal concentrate-discharging vibration to the table, substantially as and for the purposes specified.

5. In an ore-concentrator, the combination of a concentrating-table having a plurality of longitudinally-disposed rectilinearly-extending concentrating depressions or channels adapted to discharge concentrates at one end, which channels both shoal and narrow in the same direction longitudinally of the table and have a transverse section formed by the meeting at an obtuse angle of a gentle and an abrupt incline, and means for imparting a longitudinal concentrate-discharging vibration to the table, substantially as and for the purposes specified.

6. In an ore-concentrator, the combination of a concentrating-table having a plurality of longitudinally-disposed rectilinearly - extending concentrating channels or depressions which are deeper at the tail side than at the feed side and which shallow laterally from the deeper side to the plane of the table and both narrow and shoal in the same direction longitudinally of the table, and means for imparting a longitudinal concentrate-discharging vibration to the table, substantially as and for the purposes specified.

7. In an ore-concentrator, the combination of a concentrating-table having a plurality of longitudinally - disposed rectilinearly-extending concentrating channels or depressions adapted to discharge concentrates at one end, which channels or depressions shoal and narrow in the same direction longitudinally of the table, said channels successively increasing in depth from the feed side toward the tailings side of the table, and means for imparting a longitudinal concentrate-discharging vibration to the table, substantially as and for the purposes specified.

8. In an ore-concentrator, the combination of a concentrating-table having a plurality of concentrating-channels substantially parallel to the line of vibration of the table, said channels having the cross-section due to the meeting at an obtuse angle of a gentle and an abrupt incline, and said channels deeper at the tail side than at the feed side of the table, and means for imparting a vibration to the table, substantially as and for the purposes specified.

9. In an ore-concentrator, the combination of a transversely-inclined concentrating-table having a plurality of longitudinally-disposed concentrating channels or depressions which narrow or contract longitudinally of the table and which are separated by plane areas, means for imparting a longitudinal vibration to the table in the line of the channels, and means for supplying dressing - water to the table, substantially as and for the purposes specified.

10. In an ore-concentrator, the combination of a transversely-inclined concentrating-table having a plurality of longitudinally-disposed concentrating depressions or channels which shoal and narrow or contract longitudinally of the table and which are separated by plane areas which narrow in reverse direction to the channels, means for imparting to the table a longitudinal vibration in the line of the channels, and means for supplying dressing-water to the table, substantially as and for the purposes specified.

11. In an ore-concentrator, the combination of a transversely-inclined concentrating-table having a plurality of longitudinally-disposed concentrating channels or depressions which narrow or contract longitudinally of the table and are separated by plane areas which narrow in reverse direction to the channels, said channels having a transverse section formed by a gentle and an abrupt incline which meet at an obtuse angle, means for imparting a longitudinal vibration to the table in the line of the channels, and means for supplying dressing-water to the table, substantially as and for the purposes specified.

12. In an ore-concentrator, the combination of a concentrating-table having a plurality of concentrating channels or depressions disposed parallel to the longitudinal axis of the table, the feed side of the table being inclined at an oblique angle thereto and diverging from the rear end of the table, a feed device adapted to deliver on a line parallel with the diverging edge of the feed side of the table, and means for imparting longitudinal vibration to the table, substantially as and for the purposes specified.

13. In an ore-concentrator, the combination of a concentrating-table having a plurality of concentrating channels or depressions which shoal and narrow in the same direction and are disposed parallel to the longitudinal axis of the table, the feed side of the table being inclined at an oblique angle to the longitudinal axis of the table and diverging from the rear end thereof, a feed device adapted to deliver on a line parallel with the diverging edge of the feed side of the table, and means for imparting a longitudinal vibration to the table, substantially as and for the purposes specified.

14. In an ore-concentrator, the combination with a table having a plurality of concentrating depressions or channels which narrow longitudinally, the cross-section of the channels formed by a gentle and an abrupt incline which meet at an obtuse angle, said channels being disposed parallel to the longitudinal axis of the table, the feed side of the table being inclined at an oblique angle to the longitudinal axis of the table and diverging from the rear end thereof, of a feed device adapted to deliver on a line parallel with the diverging edge of the feed side of the table, and means for imparting a longitudinal vibration to the table, substantially as and for the purposes specified.

15. In an ore-concentrator, the combination of a table having a plurality of concentrating depressions or channels which narrow and shoal in the same direction, the cross-section of the channels being formed by a gentle and an abrupt incline which meet at an obtuse angle, the upper or feed side of the table being double inclined, the intersection of said inclines being intermediate of the ends of the table, the channels being disposed parallel to the longitudinal axis of the table, a feed device adapted to deliver on a line parallel with the diverging edge of the feed side of the table, and means for imparting longitudinal vibration to the table, substantially as and for the purposes specified.

16. In an ore-concentrator, the combination of a concentrating-table, a feeder having a bottom inclined downwardly from the feed-outlet, and means for actuating the concentrating-table, substantially as and for the purposes specified.

17. In an ore-concentrator, the combination of a concentrating-table, a feeder having a bottom inclined downwardly from the feed-outlet, and means for independently actuating the concentrating-table and feeder, substantially as and for the purposes specified.

18. In an ore-concentrator, the combination of a concentrating-table, a feeder having a bottom inclined downwardly from the feed-outlet, means for adjustably supporting said feeder, and means for independently actuating the concentrating-table and feeder, substantially as and for the purposes specified.

19. In an ore-concentrator, the combination of a concentrating-table having its feed side adjacent to the rear end inclined at an oblique angle to the longitudinal axis of the table and diverging from the rear of the table, a feeder having a bottom inclined downwardly from the feed-outlet thereof and arranged adjacent to and parallel with the said inclined feed side of the table, and means for imparting a longitudinal vibration to the table, substantially as and for the purposes specified.

20. In an ore-concentrator, the combination of a concentrating-table having its feed side adjacent to the rear end inclined at an oblique angle to the longitudinal axis of the table, a feeder having a bottom inclined downwardly from the feed-outlet thereof and arranged adjacent to and parallel with the said inclined feed side of the table, and means for independently actuating the concentrating-table and the feeder, substantially as and for the purposes specified.

21. In an ore-concentrator, the combination of a concentrating-table having its feed side adjacent to the rear end inclined at an oblique angle to the longitudinal axis of the table, a feeder having a bottom inclined downwardly from the feed-outlet thereof and arranged adjacent to and parallel with the said inclined feed side of the table, means for adjustably supporting said feeder, and means for actuating the concentrating-table and feeder, substantially as and for the purposes specified.

22. In an ore-concentrator, the combination of a concentrating-table, a feeder having converging sides and a bottom inclined downwardly from the feed-outlet, said feeder arranged with its outlet side at an oblique angle to the longitudinal axis of the table and divergent outwardly from the head end of the table, and means for actuating the concentrating-table and feeder, substantially as and for the purposes specified.

23. In an ore-concentrator, the combination of a concentrating-table, a feeder having converging sides and a bottom inclined downwardly from the feed-outlet, said feeder arranged with its outlet side at an oblique angle to the longitudinal axis of the table and divergent outwardly from the head end of the table, means for adjustably supporting said feeder, and means for actuating the concentrating-table and feeder, substantially as and for the purposes specified.

24. In an ore-concentrator, the combination of a concentrating-table, a feeder having converging sides and a bottom inclined downwardly from the feed-outlet, said feeder arranged with its outlet side at an oblique angle to the longitudinal axis of the table, means for adjustably supporting said feeder, and means for reversely vibrating the table and the feeder, substantially as and for the purposes specified.

25. In an ore-concentrator, the combination with a concentrating-table of increased width intermediate of its ends, of a feeder having a bottom inclined downwardly from the feed-outlet and sides which converge from the feed end thereof, said feeder arranged parallel with the diverging side of the table adjacent to the feed end thereof, and means for actuating the concentrating-table and feeder, substantially as and for the purposes specified.

26. In an ore-concentrator, the combination with a concentrating-table of increased width intermediate of its ends, said concentrating-table having longitudinally-disposed concentrating depressions or channels deeper at one side than at the other and which channels shoal longitudinally, of a feeder having converging sides and a bottom inclined downwardly from the feed-outlet, said feeder arranged with its outlet side at an oblique angle to the longitudinal axis of the table, and means for actuating the concentrating-table and the feeder, substantially as and for the purposes specified.

27. In an ore-concentrator, the combination with a concentrating-table of increased width intermediate of its ends and provided with concentrating depressions or channels which shoal and narrow longitudinally, of a feeder having converging sides and a bottom inclined downwardly from the feed-outlet, said feeder arranged adjacent to the feed side of the table and with its outlet side at an oblique angle to the longitudinal axis of the table, and means for actuating said concentrating-table and feeder, substantially as and for the purposes specified.

28. In an ore-concentrator, the combination with a concentrating-table of increased width intermediate of its ends and having concentrating depressions or channels which are deeper on one side than on the other, which channels both narrow and shoal longitudinally, of a feeder having converging sides and a bottom which inclines downwardly from the feed-outlet, said feeder arranged adjacent to the feed side of the table with its feed-outlet on a line which intersects the longitudinal axis of the table at an oblique angle at the rear, and means for actuating said concentrating-table and feeder, substantially as and for the purposes specified.

29. In an ore-concentrator, the combination with a concentrating-table of increased width intermediate of its ends and having concentrating channels or depressions which both narrow and shoal longitudinally, of a feeder having converging sides and a bottom inclined downwardly from the feed-outlet, said feeder arranged adjacent to the feed side of the table with its feed-outlet on a line which intersects the longitudinal axis of the table at an oblique angle at the rear, means for adjustably supporting said feeder and means for actuating the feeder and the concentrating-table, substantially as and for the purposes specified.

30. In an ore-concentrator, the combination with a table having longitudinal frame-timbers, of a tilting frame comprising parallel track-rods and cross-arms which connect the track-rods, a subframe having longitudinal frame-timbers, the longitudinal frame-timbers of the table, the track-rods and the longitudinal timbers of the subframe being all in substantially the same vertical planes, which planes are equidistant from the plane of the axes of said table, tilting frame and subframe, and transversely-sliding wedges or inclines, which are supported on the subframe and support the track-rods, substantially as and for the purposes specified.

31. In an ore-concentrator, the combination with a concentrating-table, of a tilting frame comprised of parallel track-rods and cross-arms which connect the track-rods, the table having slide-bearings on the track-rods, pillow-blocks for the cross-arms of the tilting frame, said pillow-blocks located in a vertical plane coincident with the longitudinal axes of the tilting frame and table, and transversely-sliding wedges or inclines which support the track-rods of the tilting frame, substantially as and for the purposes specified.

32. In an ore-concentrator, the combination with a concentrating-table, of a tilting frame therefor comprising parallel track-rods and cross-arms which connect the track-rods, the table having sliding bearings on the track-rods, transversely-sliding wedges or inclines which support the parallel track-rods of the tilting frame, and a draw-bar for actuating the table, the longitudinal axes of concentrating-table, tilting frame and draw-bar being in the same vertical plane, substantially as and for the purposes specified.

33. In an ore-concentrator, the combination with an ore-concentrating table, of a draw-bar, an actuating-spring, a buffer-spring, and an adjustable washer or spring-seat, substantially as and for the purposes specified.

34. In an ore-concentrator, the combination with an ore-concentrating table, and its actuating devices, of heavy rubber washers interposed between the table and its actuating devices, substantially as and for the purposes specified.

35. In an ore-concentrator, the combination of a concentrating-table having a plurality of depressions or channels constituted of a gentle and an abrupt incline uniting at an obtuse angle, said channels separated by intermediate plane portions which lie in the plane of the table, and means for actuating said table, substantially as and for the purposes specified.

36. In an ore-concentrator, the combination of a concentrating-table having a concentrating-surface comprised of a plurality of longitudinally-disposed channels or depressions made up of gentle and abrupt inclines which meet at an obtuse angle, which channels shoal and narrow longitudinally and are separated by intermediate plane surfaces, and means for actuating said table, substantially as and for the purposes specified.

37. In an ore-concentrator, the combination of a concentrating-table having a plurality of concentrating depressions or channels which are made up of a gentle and an abrupt incline which meet at an obtuse angle and which shoal longitudinally, said channels or depressions separated by plane portions which lie in the plane of the table, and means for actuating said table, substantially as and for the purposes specified.

38. In an ore-concentrator, the combination of a concentrating-table having longitudinally-disposed depressions or channels adapted to freely discharge concentrates at one end, said channels having a transverse section formed by a gentle and an abrupt incline which meet at an obtuse angle, said channels or depressions separated by intermediate plane portions which lie in the plane of the table, and means for imparting a longitudinal vibration to the table in the line of the channels, substantially as and for the purposes specified.

39. In an ore-concentrator, the combination of a table having longitudinally-disposed depressions or channels adapted to freely discharge concentrates at one end, said channels having a transverse section formed by the union at an obtuse angle of a gentle and an abrupt incline, which channels shoal longitudinally and are separated by intermediate plane surfaces, and means for imparting a longitudinal vibration to the table in the line of the channels, substantially as and for the purposes specified.

40. In an ore-concentrator, the combination of a table having longitudinally-disposed depressions or channels adapted to freely discharge concentrates at one end, said channels having the cross-section produced by the meeting at an obtuse angle of a gentle and an abrupt incline, which channels narrow and shoal in the same direction and are separated by intermediate plane areas which lie in the plane of the table, and means for imparting a longitudinal vibration to the table in the line of the channels, substantially as and for the purposes specified.

41. In an ore-concentrator, the combination of a concentrating-table having longitudinally-disposed concentrating channels or depressions adapted to freely discharge the concentrates at one end, which channels narrow and shoal longitudinally of the table and have a transverse section formed by a gentle and an abrupt incline which meet at an obtuse angle, said channels separated by intermediate plane areas which narrow in a direction the reverse of the channels, and means for imparting a longitudinal vibration to the table in the line of the channels, substantially as and for the purposes specified.

42. In an ore-concentrator, the combination of a concentrating-table, a feeder having sides which converge from the feed end of the feeder and a bottom downwardly inclined from the feed-outlet thereof, means for adjusting the lateral inclination of the concentrating-table, means for supporting the feeder independently of the table or its adjusting mechanism, and means for actuating the concentrating-table, substantially as and for the purposes specified.

43. In an ore-concentrator, the combination of a concentrating-table, a feeder having its bottom inclined downwardly from the feed-outlet, means for supporting the feeder independently of the table, means for independently and reversely reciprocating the table and feeder, substantially as and for the purposes specified.

44. In an ore-concentrator, the combination of a concentrating-table, a feeder having sides which converge from the feed end of the feeder and a bottom downwardly inclined from the feed-outlet, means for varying the relative heights of the ends of the feeder, and means for actuating the concentrating-table and the feeder, substantially as and for the purposes specified.

45. In a concentrator, the combination of a concentrating-table, a feeder having a bottom downwardly inclined from the feed-outlet, means for varying the relative heights of the ends of the feeder, and means for reversely reciprocating the table and the feeder, substantially as and for the purposes specified.

46. In an ore-concentrator, the combination with a concentrating-table having its upper or feed side double-inclined, the inclines intersecting at a point intermediate of the ends of the table, a feeder having a bottom inclined downwardly from the feed-outlet thereof and arranged parallel with the rear incline of the feed side of the table, and means for actuating the table and the feeder, substantially as and for the purposes specified.

47. In an ore-concentrator, the combination of an ore-concentrating table having a plurality of concentrating channels or depressions disposed parallel to the longitudinal axis of the table, a feeder having a bottom inclined downwardly from the feed-outlet thereof and arranged adjacent to the upper or feed side of the table on a line which intersects the longitudinal axis of the table at an oblique angle at the rear of the table, and means for imparting a longitudinal vibration to the table, substantially as and for the purposes specified.

48. In an ore-concentrator, the combination of a concentrating-table having a plurality of concentrating channels or depressions disposed parallel to the longitudinal axis of the table, a feeder having a bottom inclined downwardly from the feed-outlet thereof and arranged adjacent to the upper or feed side of the table on a line which intersects the longitudinal axis of the table at an oblique angle at the rear of the table, and means for independently reciprocating the table and the feeder, substantially as and for the purposes specified.

49. In an ore-concentrator, the combination of a concentrating-table having a plurality of concentrating channels or depressions disposed parallel to the longitudinal axis of the table, a feeder having a bottom inclined downwardly from the feed-outlet thereof, and arranged adjacent to the upper or feed side of the table on a line which intersects the longitudinal axis of the table at an oblique angle at the rear of the table, means for adjustably supporting said feeder, and means for independently actuating said table and said feeder, substantially as and for the purposes specified.

50. In an ore-concentrator, the combination of a concentrating-table having a plurality of concentrating depressions or channels disposed parallel to the longitudinal axis of the table, the feed or upper side of the table being double-inclined, the intersection of said inclines being intermediate of the ends of the table, a feed device adapted to deliver on a line parallel with the rear incline of the feed side of the table and divergent outwardly from the head end of the table, and means for imparting longitudinal vibration to the table, substantially as and for the purposes specified.

51. In an ore-concentrator, the combination of a concentrating-table having a plurality of concentrating depressions or channels which shoal and narrow in the same direction, the cross-section of the channels being formed by a gentle and an abrupt incline which meet at an obtuse angle, the channels disposed parallel to the longitudinal axis of the table and adapted to freely discharge the concentrates at one end, and means for imparting a longitudinal vibration to the table in the line of the channels, substantially as and for the purposes specified.

52. In an ore-concentrator, the combination of a concentrating-table having longitudinally-disposed concentrating-channels adapted to freely discharge the concentrates at one end, said channels having a transverse section formed by a gentle incline and an abrupt incline which meet at an obtuse angle, and means for imparting longitudinal vibration to the table in the line of the channels, substantially as and for the purposes specified.

In testimony whereof we affix our signatures, in presence of two witnesses, this 14th day of August, 1902.

WILLIAM L. CARD.
FRANK S. CARD.

Witnesses:
JAS. S. SMITH,
CHAS. S. JACOBS.